(12) United States Patent
Tanaka et al.

(10) Patent No.: US 7,912,513 B2
(45) Date of Patent: Mar. 22, 2011

(54) IN-VEHICLE DEVICE HAVING HARD DISK DRIVE AND METHOD FOR CONTROLLING THE SAME

(75) Inventors: Makoto Tanaka, Anjo (JP); Takahisa Ozaki, Gamagori (JP)

(73) Assignee: Denso Corporation, Kariya (JP)

( * ) Notice: Subject to any disclaimer, the term of this patent is extended or adjusted under 35 U.S.C. 154(b) by 379 days.

(21) Appl. No.: 12/232,831

(22) Filed: Sep. 25, 2008

(65) Prior Publication Data

US 2009/0088205 A1 Apr. 2, 2009

(30) Foreign Application Priority Data

Sep. 27, 2007 (JP) ................... 2007-251736

(51) Int. Cl.
*H00M 1/00* (2006.01)
(52) U.S. Cl. .................. 455/569.2; 455/567; 455/569.1; 455/415; 455/421; 701/200; 701/213; 701/207; 701/209; 360/69
(58) Field of Classification Search .... 455/569.1–569.2, 455/567, 566, 415, 421; 701/200, 213, 207, 701/209
See application file for complete search history.

(56) References Cited

U.S. PATENT DOCUMENTS

| 7,171,305 | B2 | 1/2007 | Minato et al. | |
| 2004/0267446 | A1 * | 12/2004 | Minato et al. | ................. 701/209 |

FOREIGN PATENT DOCUMENTS

| JP | A-2001-111676 | 4/2001 |
| JP | A-2005-072943 | 3/2005 |

OTHER PUBLICATIONS

Office Action dated Sep. 1, 2009 from Japan Patent Office in corresponding JP application No. 2007-251736 (and English translation).
First Office Action issued from the Chinese Patent Office on Aug. 11, 2010 in the corresponding Chinese patent application No. 200810161019.9 (with English translation).

* cited by examiner

*Primary Examiner* — Kent Chang
*Assistant Examiner* — Dung Lam
(74) *Attorney, Agent, or Firm* — Posz Law Group, PLC

(57) ABSTRACT

An in-vehicle device includes: a communication element; a coupling element for coupling and decoupling between the in-vehicle device and a cell phone via the communication element; a hard disk drive for storing a telephone directory data; an incoming call notification element for notifying a passenger about an incoming call, accessing the telephone directory data, and notifying individual information of a caller; a high altitude decision element for deciding whether the vehicle is disposed in a high altitude area; and a switching element for setting the hard disk drive in an off-mode when the vehicle enters into the high altitude area, and for setting the hard disk drive in an on-mode when the vehicle passes through the high altitude area. The incoming call notification element stops notifying the incoming call and the individual information when the hard disk drive is in the off-mode.

7 Claims, 4 Drawing Sheets

IN-VEHICLE DEVICE HAVING HARD DISK DRIVE AND METHOD FOR CONTROLLING THE SAME

CROSS REFERENCE TO RELATED APPLICATION

This application is based on Japanese Patent Application No. 2007-251736 filed on Sep. 27, 2007, the disclosure of which is incorporated herein by reference.

FIELD OF THE INVENTION

The present invention relates to an in-vehicle device having a hard disk drive and a method for controlling an in-vehicle device.

BACKGROUND OF THE INVENTION

A conventional in-vehicle device having a hard disk drive (i.e., HDD) is suitably used for a car navigation device, in which the hard disk drive stores map data. For example, the conventional in-vehicle device is disclosed in JP-A-2004-317385, which corresponds to U.S. Pat. No. 7,171,305. This HDD type car navigation device can search a route to a destination quickly, compared with a DVD/CD type car navigation device for reading a map data out from a DVD or a CD. Thus, the HDD type car navigation device is familiar among people.

In the hard disk drive, a head is floated by air flow caused by rotation of a disk, so that the head reads magnetic information recorded in the disk. Thus, when a vehicle is disposed at a high altitude place so that atmospheric pressure is low, the head may contact the disk so that the disk is damaged.

The present inventors has studied a hard disk drive, which is controlled such that a head in the hard disk drive is retrieved and a motor for rotating the disk turns off when a vehicle moves to a high altitude area having altitude equal to or higher than a predetermined altitude. Further, the hard disk drive is controlled such that the motor turns on and the head is returned to a normal operating position after the vehicle goes through. When the hard disk drive turns off in accordance with the altitude, the disk is prevented from being damaged, which is caused by reduction of atmospheric pressure.

However, the conventional car navigation device provides a route guiding function and other functions. Data relating to these functions are stored in the hard disk drive. In this case, when the vehicle moves into the high altitude area, these functions are not utilized.

For example, in the car navigation device, the hard disk drive stores data of a telephone directory. When a cell phone of a user is coupled with the navigation device via a cable or a short range wireless communication (e.g., a Bluetooth communication), and when the cell phone receives communication with an external sender (i.e., a caller), information about the sender such as the name of the sender is noticed to the user in the vehicle via the navigation device based on the data of the telephone directory in the hard disk drive. Here, "Bluetooth" is the registered trademark of Bluetooth Special Interest Group. For example, an in-vehicle display displays the name of the sender registered in the telephone directory together with status information of an incoming call.

In the above navigation device, when the vehicle is disposed at the high altitude place, the hard disk drive turns off. Accordingly, even when the cell phone receives the communication from the sender, the data of the telephone directory stored in the hard disk drive is not referred. Thus, the navigation device cannot notice the information about the sender corresponding to a telephone number of the sender registered in the telephone directory.

Accordingly, in this case, for example, the telephone number of the sender is noticed to the user. The information about the telephone number of the sender is not derived from the telephone directory, which is similar to a case where the communication from a telephone number which is not registered in the telephone directory.

Recent user of a cell phone always responds to the communication from a sender after the user confirms the sender. Accordingly, if the user cannot confirm the sender, the user may have bad feeling.

When the vehicle is not disposed in the high altitude area, the navigation device informs the information about the sender based on the telephone directory. However, when the vehicle is disposed in the high altitude area, the navigation device does not inform the information about the sender. Thus, when the cell phone of the user receives the communication from the sender, and the vehicle is disposed at the high altitude place, the user may misunderstand that the user receives from an unknown person's call even if the sender is registered in the telephone directory. The user may become anxious. Therefore, it is not preferred that only the telephone number of the sender is informed to the user without referring to the telephone directory when the hard disk drive turns off since the vehicle is disposed at the high altitude place.

SUMMARY OF THE INVENTION

In view of the above-described problem, it is an object of the present disclosure to provide an in-vehicle device having a hard disk drive. It is another object of the present disclosure to provide a method for controlling an in-vehicle device having a hard disk drive.

According to a first aspect of the present disclosure, an in-vehicle device includes: a communication element for communicating with a cell phone in a vehicle; a coupling element for coupling and decoupling between the in-vehicle device and the cell phone via the communication element; a hard disk drive for storing a telephone directory data relating to an individual information and a telephone number corresponding to the individual information; an incoming call notification element for communicating with the cell phone via the communication element in a case where the coupling element couples between the in-vehicle device and the cell phone, wherein the incoming call notification element notifies a passenger of the vehicle about an incoming call from a caller when the cell phone receives the incoming call via an external telephone network, and wherein the incoming call notification element accesses the telephone directory data in the hard disk drive, and notifies the passenger about the individual information corresponding to the telephone number of the caller; a high altitude decision element for deciding whether the vehicle is disposed in a high altitude area having an altitude equal to or higher than a predetermined altitude; and a switching element for setting the hard disk drive in an off-mode based on a decision result of the high altitude decision element in a case where the vehicle enters into the high altitude area, and for setting the hard disk drive in an on-mode in a case where the vehicle passes through the high altitude area. The incoming call notification element stops notifying the passenger about the incoming call and the individual information when the hard disk drive is in the off-mode.

In the above device, the in-vehicle device does not notify the incoming call and the individual information when the hard disk drive is in the off-mode. Thus, when the vehicle is disposed in the high altitude area, the incoming call is not informed to the passenger. The passenger does not misunderstand that the incoming call is derived from an unknown caller even when the telephone number of the caller is recorded in the telephone directory data. Therefore, the passenger does not become anxiety.

Alternatively, the communication element may communicate in a short range wireless communication, and the coupling element couples between the in-vehicle device and the cell phone via the communication element in a short range wireless communication manner.

Alternatively, the in-vehicle device may further include: a position detector for detecting a current position of the vehicle; and a semiconductor memory for storing a two-dimensional map data, which defines the high altitude area. The two dimensional map data includes a plurality of regions, which is provided by dividing a ground surface. The two dimensional map data shows whether a region is the high altitude area. The high altitude decision element accesses the two-dimensional map data in the semiconductor memory, and decides whether the region corresponding to the current position of the vehicle is the high altitude area.

According to a second aspect of the present disclosure, an in-vehicle device includes: a communication element for communicating with a cell phone in a vehicle; a coupling element for coupling and decoupling between the in-vehicle device and the cell phone via the communication element; a hard disk drive for storing a telephone directory data relating to an individual information and a telephone number corresponding to the individual information; an incoming call notification element for communicating with the cell phone via the communication element in a case where the coupling element couples between the in-vehicle device and the cell phone, wherein the incoming call notification element notifies a passenger of the vehicle about an incoming call from a caller when the cell phone receives the incoming call via an external telephone network, and wherein the incoming call notification element accesses the telephone directory data in the hard disk drive, and notifies the passenger about the individual information corresponding to the telephone number of the caller; a high altitude decision element for deciding whether the vehicle is disposed in a high altitude area having an altitude equal to or higher than a predetermined altitude; and a switching element for setting the hard disk drive in an off-mode based on a decision result of the high altitude decision element in a case where the vehicle enters into the high altitude area, and for setting the hard disk drive in an on-mode in a case where the vehicle passes through the high altitude area. The coupling element decouples between the in-vehicle device and the cell phone when the hard disk drive is in the off-mode, and the coupling element couples between the in-vehicle device and the cell phone when the hard disk drive is in the on-mode.

In the above device, the in-vehicle device does not notify the incoming call and the individual information when the hard disk drive is in the off-mode. Thus, when the vehicle is disposed in the high altitude area, the incoming call is not informed to the passenger. The passenger does not misunderstand that the incoming call is derived from an unknown caller even when the telephone number of the caller is recorded in the telephone directory data. Therefore, the passenger does not become anxiety.

According to a third aspect of the present disclosure, a method for controlling an in-vehicle device includes: communicating with a cell phone in a vehicle; coupling and decoupling between the in-vehicle device and the cell phone; storing a telephone directory data in a hard disk drive, wherein the data relates to an individual information and a telephone number corresponding to the individual information; notifying a passenger of the vehicle about an incoming call from a caller when the cell phone receives the incoming call via an external telephone network; accessing the telephone directory data in the hard disk drive, and notifying the passenger about the individual information corresponding to the telephone number of the caller; deciding whether the vehicle is disposed in a high altitude area having an altitude equal to or higher than a predetermined altitude; and setting the hard disk drive in an off-mode when the vehicle enters into the high altitude area, and setting the hard disk drive in an off-mode when the vehicle passes through the high altitude area. The notifying the passenger about the incoming call and the accessing the telephone directory data are prohibited when the hard disk drive is in the off-mode.

In the above method, the in-vehicle device does not notify the incoming call and the individual information when the hard disk drive is in the off-mode. Thus, when the vehicle is disposed in the high altitude area, the incoming call is not informed to the passenger. The passenger does not misunderstand that the incoming call is derived from an unknown caller even when the telephone number of the caller is recorded in the telephone directory data. Therefore, the passenger does not become anxiety.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
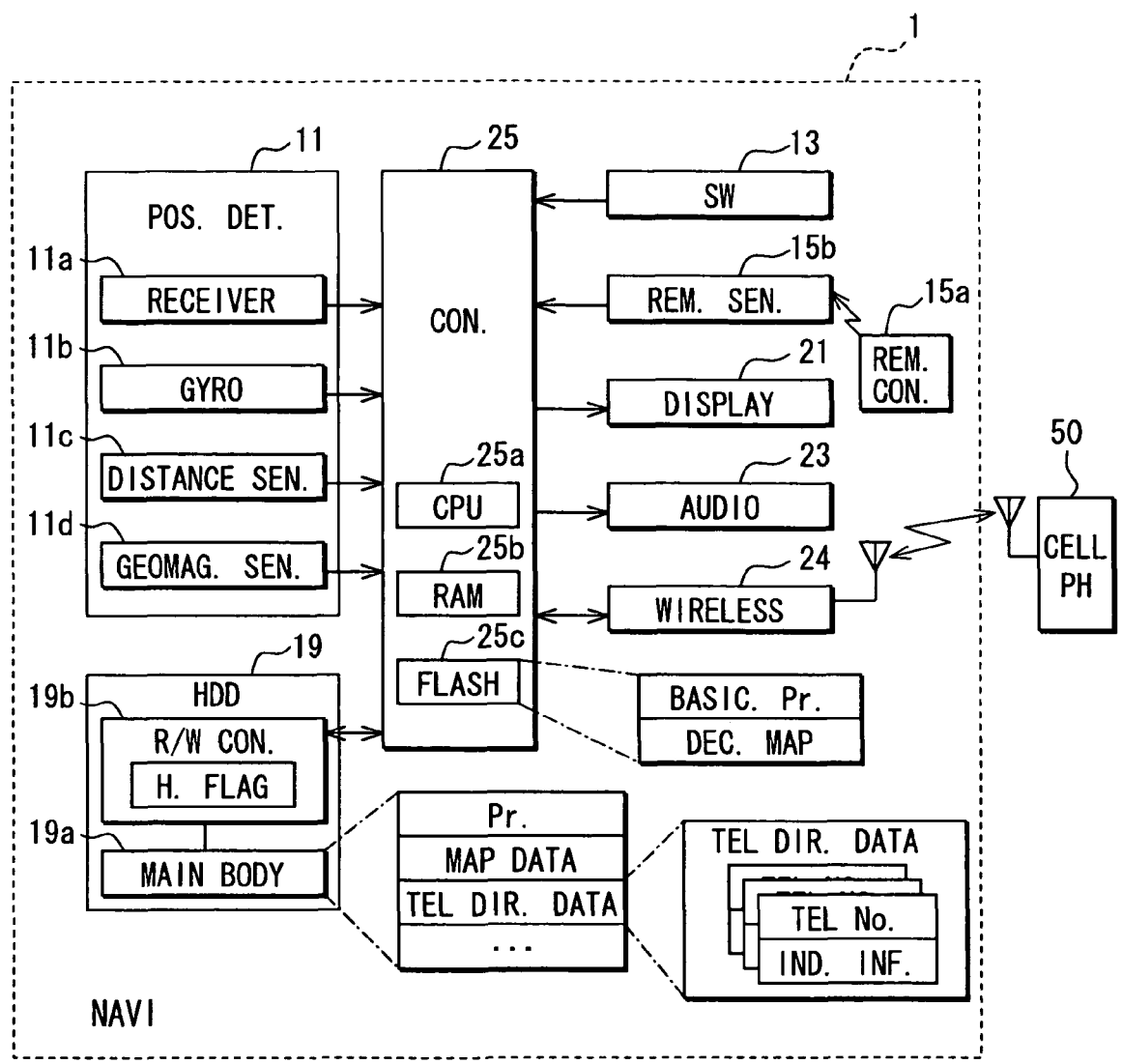
FIG. 1 is a block diagram showing a car navigation device.

FIG. 1 shows a car navigation device 1, which is suitably used for a vehicle such as an automotive vehicle.

The navigation device 1 includes a position detector 11, multiple operation switches 13, a remote control element 15a, a remote control sensor 15b for detecting a signal from the remote control element 15a, a hard disk drive 19 for storing information such as map data, a display 21 for displaying various images on a screen of the display 21, an audio output element 23 for outputting various voice messages or various sounds, a wireless communication element 24 for communicating in a short range without wire, and a controller 25 for controlling each part of the navigation device 1.

The position detector 11 includes a GPS receiver 11a, a gyroscope 11b, a distance sensor 11c and a geomagnetic sensor 1id. The GPS receiver 11a receives an electric wave from an artificial satellite for a global positioning system (i.e., GPS) through a GPS antenna so that the GPS receiver 11a detects latitude and longitude of a current position of the vehicle. The gyroscope 11b detects rotational movement applied to the vehicle. The distance sensor 11c detects a travel distance of the vehicle. The geomagnetic sensor 11d detects a traveling direction of the vehicle based on the detected geomagnetic field. Each detection signal from the GPS receiver 11a, the gyroscope 11b, the distance sensor 11c and the geomagnetic sensor 11d is input in the controller 25.

The switches 13 include, for example, a key switch and/or a touch panel switch so that the user can operate the switches 13. Thus, the switches 13 provide a user interface to the device 1. The key switch is a mechanical switch and disposed around the display 21. The touch panel switch is integrated with the display 21.

The display 21 is made of liquid crystal monitor. The controller 25 controls the display 21 such that a map around the current position of the vehicle and a route for a destination are displayed on a screen of the display 21. The destination is registered by the user. The audio output element 23 includes a speaker and an amplifier, and is controlled by the controller 25. The audio output element 23 outputs a voice message and/or sound for guiding the route to the destination.

The wireless communication element 24 provides a short range wireless communication means. The wireless communication element 24 directly communicates with a cell phone 50 without using a conventional telephone network. The cell phone 50 having a short range wireless communication function is disposed in the vehicle. The short range wireless communication function is provided by, for example, Bluetooth communication technique. The wireless communication element 24 is formed from, for example, a Bluetooth communication module.

The hard disk drive 19 includes a main body 19a and a read/write controller 19b. The main body 19a includes a magnetic disk, a motor for driving the disk, a head for reading magnetic data from and writing magnetic data in the disk, an arm for supporting the head, and another motor for driving the arm. The read/write controller 19b controls the main body 19a.

In the hard disk drive 19, the controller 25 sends an instruction to the read/write controller 19b so that the main body 19a is controlled by the read/write controller 19b. Thus, in view of this instruction, the hard disk drive 19 writes data in the magnetic disk, and reads the data from the disk.

The controller 25 sends an instruction to the hard disk drive 19 so that the hard disk drive 19 inputs a program and/or data in the controller 25. The program such as a program for executing functions of the navigation device 1 and the data such as map data and telephone directory data are stored in the hard disk drive 19.

Specifically, the hard disk drive 19 stores the map data which includes a road link and node data for representing a connection of roads, a geological data, a facility data, a map matching data for improving position detection of the vehicle, and an audio data for guiding a route.

The hard disk drive 19 stores the telephone directory data which includes an individual data for representing a relationship between a telephone number and individual information corresponding to the telephone number. The individual information is, for example, a name of a person or a representative corresponding to the telephone number. The telephone directory data is updated according to an instruction of the user, which is input from the user interface, i.e., the switches 13 or the like.

In the hard disk drive 19, the read/write controller 19b includes a non-volatile memory, which stores a flag showing a high altitude place (i.e., a high altitude flag). The flag for a high altitude place represents whether the current position of the vehicle is disposed in the high altitude area having altitude equal to or higher than a predetermined altitude. If the hard disk drive operates at the high altitude place, the magnetic disk may be down or damaged when the disk is rotated and the head is displaced from a standby position to an operation position.

The hard disk drive 19 refers to the flag when the navigation device 1 is activated. When the flag is set so that the vehicle is disposed at the high altitude place, the head of the hard disk drive stays at the standby position, and the disk is not rotated. Until the vehicle passes through the high altitude area, the main body 19a turns off. When the hard disk drive 19 is in an off mode, the read/write controller 19b functions, but the main body 19a does not function. Specifically, when the main body 19a turns off, the head is kept at the standby position, and the disk is not rotated.

Thus, even when the hard disk drive 19 is in the off mode, the hard disk drive 19 is still energized. Therefore, when the hard disk drive 19 is in the off mode, the main function of the hard disk drive 19 cannot function. For example, the head of the hard disk 19 may be in the standby state so that the main function of the hard disk drive 19 does not function. In addition, a motor for driving the disk may turn off so that the main function of the hard disk drive 19 does not function.

Figure 2:
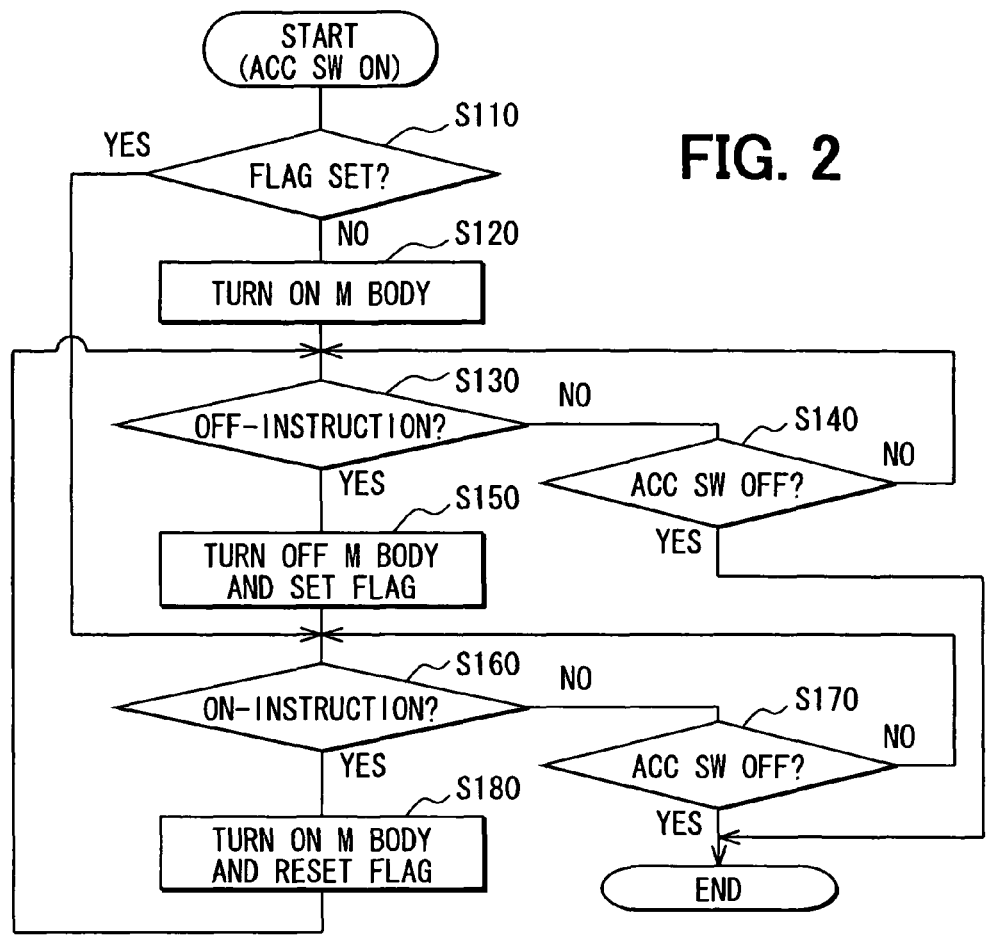
FIG. 2 is a flowchart showing an on-off control process of a hard disk drive.

FIG. 2 shows an on-off control process executed by the read/write controller 19b when the navigation device 1 is activated.

When an accessory switch (i.e., ACC switch) turns on, the navigation device 1 is activated. When the ACC switch turns off, the navigation device 1 is shut down. When the ACC switch turns on, the read/write controller 19b starts to execute the on-off control process.

When the on-off control process starts to be executed, in Step S110, the read/write controller 19b decides whether the high altitude flag is set. When the read/write controller 19b that the flag is not set but reset, i.e., it is decided to "NO" in Step S110, the main body 19a is turned on in Step S120. Specifically, the motor is operated so that the disk is rotated. Further, the head is displaced from the standby position to the operation position, and thereby, the hard disk drive 19 becomes in an on-mode, in which the hard disk drive can read the data therefrom and write the data thereon.

After Step S120, in Step S130, the read/write controller 19b determines whether an off instruction is input from the controller 25. When the off instruction is not input, i.e., when it is decided to "NO" in Step S130, in Step S140, it is determined whether the ACC switch is turned off. When the ACC switch is not turned off, i.e., when it is decided to "NO" in Step S140, it returns to Step 130 so that the process repeats Steps S130 and S140 until the off instruction is input or the ACC switch is turned off. When the ACC switch is turned off, i.e., when it is decided to "YES" in Step S140, the on-off control process ends. Then, a predetermined step such as a step for turning off the main body 19a is executed, and after that, the device 1 stops to operate.

In Step S130, when the off instruction is input from the controller 25, i.e., when it is decided to "YES" in Step S130, the read/write controller 19b controls the head to displace to the standby position, and further, controls the motor for rotating the disk to stop operating. Thus, the main body 19a is turned off, and the hard disk drive 19 is switched from the on mode to the off mode. At the same time, the flag is set in Step S150. Specifically, the high altitude flag is switched from a value "0" (i.e., a reset state) to a value "1" (i.e., a set state).

After Step S150, Step S160 and Step S170 are repeated so that the read/write controller 19b is in a standby state until the on instruction is input from the controller 25 or the ACC switch is turned off. When the ACC switch is turned off, i.e., when it is decided to "YES" in Step S170, the on-off control process ends. Then, a predetermined step such as a step for turning off the main body 19*a* is executed, and after that, the device 1 stops to operate.

In Step S160, when the on instruction is input from the controller 25, i.e., when it is decided to "YES" in Step S160, the read/write controller 19*b* controls the motor for rotating the disk to start operating again. Further, the read/write controller 19*b* controls the head to displace from the standby position to the operation position. Thus, the main body 19*a* is turned on, and the hard disk drive 19 is switched to the on mode, in which the hard disk drive 19 can read the data and write the data. In this case, the high altitude flag is reset in Step S180. After that, it proceeds to Step S130.

When the high altitude flag is set at the time of activation, i.e., when it is decided to "YES in Step S110, the read/write controller 19*b* executes Step S160 without executing Steps S120 to S150. When the on instruction is input from the controller 25, the main body 19*a* is turned on in Step S180 so that the hard disk drive 19 becomes an activation state, in which the hard disk drive 19 can read the data and write the data.

When the high altitude flag is reset at the time of activation of the navigation device 1, the hard disk drive 19 functions in the on mode. After that, according to the instruction from the controller 25, the hard disk drive 19 functions in the on or off mode. When the high altitude flag is set at the time of activation of the navigation device 1, the hard disk drive 19 functions in the off mode until the on instruction is input from the controller 25.

The hard disk drive 19 performs the above process, so that the hard disk drive 19 is protected from being damaged. Specifically, when the vehicle is disposed at the high altitude place, and the main body 19*a* is turned on at the time of activation of the navigation device 1, the hard disk drive 19 is prevented from damage caused by contact of the head on the disk.

When the navigation device 1 is activated, the high altitude flag is referred so that it is determined whether the vehicle is disposed at the high altitude place. When the vehicle is disposed at the high altitude place, the body 19*a* is controlled not to turn on.

Further, when the navigation device 1 is operated, and the vehicle enters into the high altitude area, the controller 25 sends an off instruction to the hard disk drive 19, so that the hard disk drive 19 becomes the off mode. After the vehicle passes through the high altitude area, the controller 25 sends the on instruction to the hard disk drive 19, so that the hard disk drive 19 becomes the on mode.

The controller 25 will be explained as follows. As shown in FIG. 1, the controller 25 includes a CPU 25*a*, a RAM 25*b* and a flash memory 25*c*. The CPU 25*a* executes various programs. The RAM 25*b* functions as a work area when the CPU 25*a* executes a program. The flash memory 25*c* as a nonvolatile semiconductor memory capable of re-writing data electrically.

The flash memory 25*c* stores a basic program for executing a requisite minimum process even when the hard disk drive 19 is not set in the on mode for reading and writing data since the vehicle is disposed at the high altitude place. The flash memory 25*c* stores information about a high altitude area decision map shown in FIG. 3.

The high altitude area decision map provides a two-dimensional map, which includes multiple areas defined by dividing a ground surface. The decision map shows whether each area is a high altitude area. The high altitude area has an altitude equal to or higher than a predetermined altitude, and it is necessary to avoid operation of the hard disk drive when the vehicle is disposed in the high altitude area.

The high altitude area decision map is formed by a manufacturer according to the following rule. First, the ground surface is divided into multiple areas in a mesh manner. When an area, i.e., a mesh includes at least a point having an altitude equal to or higher than a predetermined altitude, a value "1" is assigned to the mesh. When a mesh does not include any point having an altitude equal to or higher than a predetermined altitude, a value "0" is assigned to the mesh. Assigned value in each mesh is written in a data file. Thus, the high altitude area decision map is formed.

Figure 3:
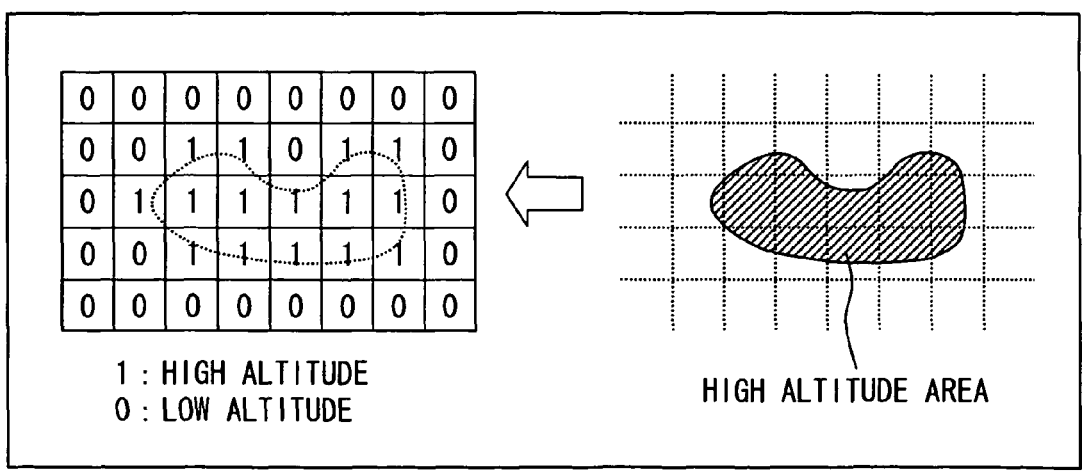
FIG. 3 is a chart showing a map for deciding a high altitude area.

A left side of FIG. 3 shows the decision map conceptually. Specifically, a region having a high altitude area shown on a right side of FIG. 3 is converted to the decision map. By forming the decision map, the amount of data for deciding the altitude area is reduced, and the data for deciding the altitude area as the decision map is stored in the flash memory 25*c*.

Figure 4:
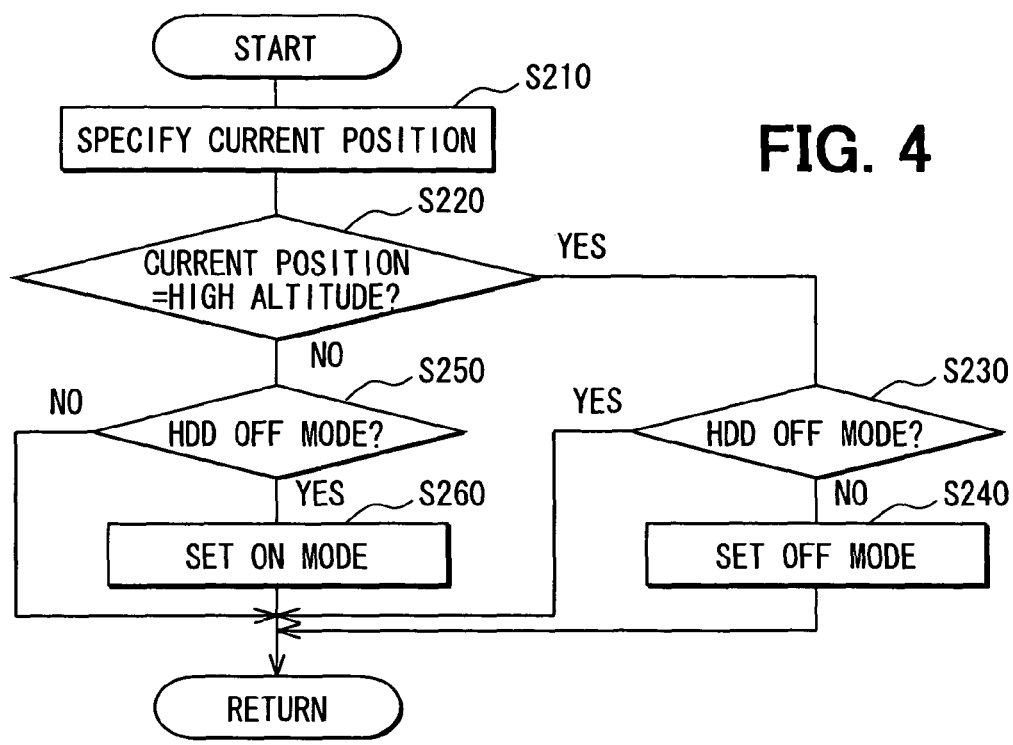
FIG. 4 is a flowchart showing an on-off switching process of the hard disk drive.

FIG. 4 shows a HDD on-off switching process, which is executed by the controller 25 when the navigation device 1 is activated. By executing the HDD on-off switching process, the controller 25 switches on and off the main body 19*a* of the hard disk drive 19*a* in accordance with the current position of the vehicle.

When the controller 25 starts to execute the HDD on-off switching process, in Step S210, the coordinates of the current position of the vehicle, i.e., a latitude and a longitude of the current position are specified based on a detection signal output from the position detector 11.

After Step S210, the controller 25 refers to the high altitude area decision map stored in the flash memory 25*c*, so that the controller 25 determines in Step S220 whether an area corresponding to the coordinates of the current position is a high altitude area.

Specifically, the controller 25 read the assigned value corresponding to the coordinates of the current position from the decision map in the flash memory 25*c*. When the assigned value is "1," the controller 25 decides that the area corresponding to the current position of the vehicle is the high altitude area. When the assigned value is "0," the controller 25 decides that the area corresponding to the current position of the vehicle is not the high altitude area, i.e., a low altitude area or a non-high altitude area.

When the controller decides that the area corresponding to the coordinates of the current position of the vehicle is the high altitude area, i.e., it is determined to "YES" in Steps S220, it proceeds to Step S230 so that the controller 25 decides whether the hard disk drive 19 is set in the off mode. When the hard disk drive 19 is not set in the off mode, i.e., when it is decided to "NO" in Step S230, it proceeds to Step S240. In Step S240, the controller 25 inputs an off instruction in the hard disk drive 19 so that the main body 19*a* of the hard disk drive 19 is switched off. Thus, the hard disk drive 19 is set to the off mode. After that, the HDD on-off switching process ends.

When the hard disk drive 19 is set to the off mode, i.e., when it is decided to "YES" in Step S230, the controller maintains the hard disk drive 19 to be in the off mode. Then, the HDD on-off switching process ends.

When the controller 25 decides that the area corresponding to the coordinates of the current position of the vehicle is the high altitude area, i.e., it is determined to "NO" in Steps S220, it proceeds to Step S250 so that the controller 25 decides whether the hard disk drive 19 is set in the off mode. When the hard disk drive 19 is set in the off mode, i.e., when it is decided to "YES" in Step S250, it proceeds to Step S260. In Step S260, the controller 25 inputs an on instruction in the hard disk drive 19 so that the main body 19a of the hard disk drive 19 is switched on. Thus, the hard disk drive 19 is set to the on mode. After that, the HDD on-off switching process ends.

When the hard disk drive 19 is set not to the off mode (i.e., when the hard disk drive 19 is set to the on mode), i.e., when it is decided to "NO" in Step S250, the controller 25 maintains the hard disk drive 19 to be in the on mode. Then, the HDD on-off switching process ends.

Thus, the controller 25 repeats the above process, and thus, the controller 25 sets the hard disk drive 19 to be the off mode according to the detection result of the position detector 11 when the vehicle enters into the high altitude area. Further, the controller 25 sets the hard disk drive 19 to be the on mode when the vehicle passes through the high altitude area.

Figure 5A:
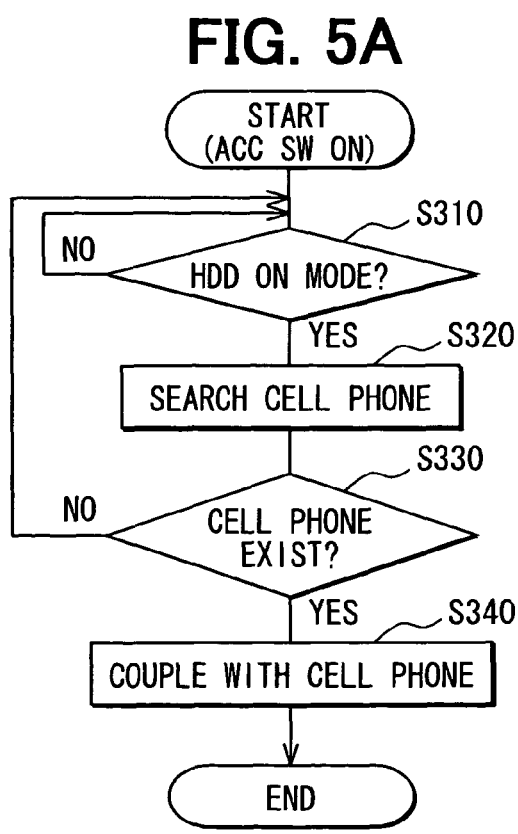
FIG. 5A is a flowchart showing a searching and coupling process.

The controller 25 executes a searching and coupling process when the navigation device 1 is activated. FIG. 5A shows the searching and coupling process when the ACC switch turns on so that the navigation device 1 is activated.

When the searching and coupling process starts, the controller 25 decides in Step S310 whether the hard disk drive 19 is set in the on mode. When the controller 25 decides that the hard disk drive 19 is not set in the on mode, i.e., when the hard disc drive 19 is set in the off mode (i.e., when it is decided to "NO" in Step S310), the controller 25 repeats Step S310, i.e., the controller 25 becomes a standby state until the hard disk drive 19 is set in the on mode.

When the controller 25 decides that hard disk drive 19 is set in the on mode, i.e., when it is decided to "YES" in Step S310, the controller 25 searches a cell phone 50 in the vehicle via the wireless communication element 24 in Step S320. When the controller 25 decides based on the searching result that there is no cell phone 50 in the vehicle, i.e., when it is decided to "NO" in Step S330, it proceeds to Step S310 so that the controller 25 periodically executes Steps S310 to 5330 until the controller 25 finds the cell phone 50 in the vehicle.

When the controller 25 decides that the cell phone 50 is disposed in the vehicle, i.e., when it is decided to "YES" in Step S330, the controller 25 establishes coupling between the cell phone 50 and the navigation device 1 via the wireless communication element 24 so that the navigation device 1 is capable of communicating the cell phone 50 in Step S340.

For example, when the coupling is provided by the Bluetooth communication, the controller 25 searches the cell phone 50 having the Bluetooth communication function, which provides a pairing to the navigation device 1. When the cell phone 50 is disposed in the vehicle or around the vehicle, the controller 25 executes a coupling process according to a predetermined protocol so that the cell phone 50 couples with the navigation device 1.

When the coupling is established, the controller 25 ends the searching and coupling process. Then, the controller 25 executes a coupling and managing process shown in FIG. 5B.

When the coupling and managing process starts, the controller 25 communicates with the cell phone 50 via the wireless communication element 24 so that the controller 25 monitors the cell phone 50. Thus, the controller 25 decides in Step S410 whether the cell phone 50 is busy. When the cell phone 50 is busy, i.e., when it is decided to "YES" in Step S410, the controller 25 ends the coupling and managing process without executing Steps S420 to S470. The controller 25 repeats Step S410 until the cell phone 50 is not busy, i.e., the controller 25 becomes a standby state.

Figure 6A:
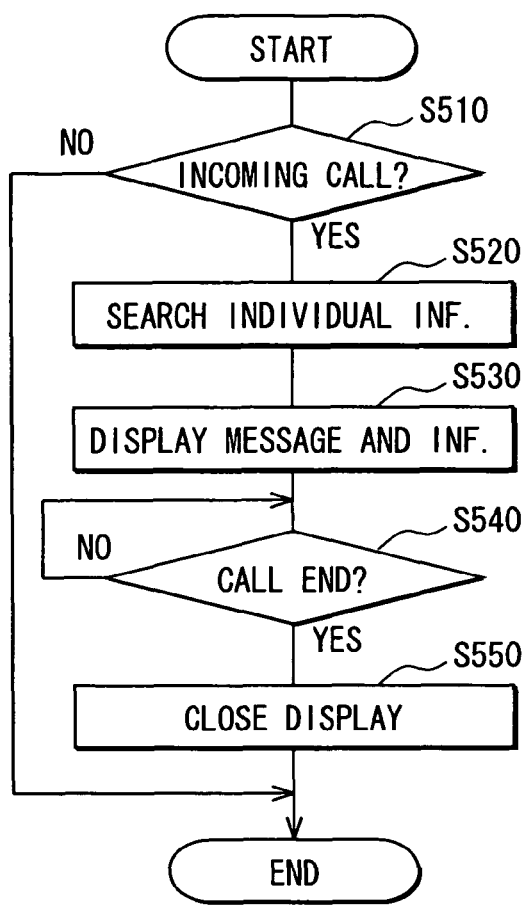
FIG. 6A is a flowchart showing a free line process.
Figure 6B:
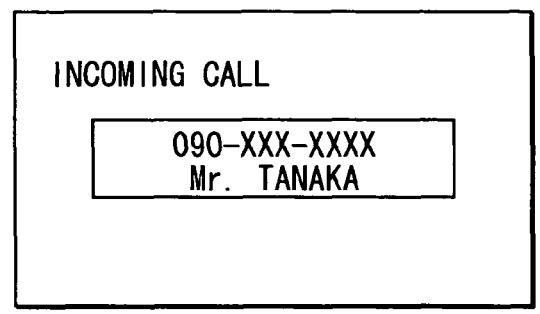
FIG. 6B is an example information on a screen of a display.

When the cell phone 50 is not bust, i.e., when it is decided to "NO" in Step S410, the controller 25 executes a free line process in Step S420. FIG. 6 shows the free line process. When the controller 25 executes the free line process, the cell phone 50 is not busy, i.e., the cell phone 50 is free.

When the free line process starts, the controller 25 decides whether the line of the cell phone 50 is busy in Step S510, i.e., the controller 25 decides whether the cell phone 50 receives an incoming call through an external telephone line network (i.e., cell phone network).

When the controller 25 decides that the cell phone 50 does not receive the incoming call, i.e., when the controller 25 decides that the cell phone 50 is not busy (i.e., when it is decided to "NO" in Step S510), the controller 25 ends the free line process without executing Steps S520 to S550.

When the controller 25 decides that the cell phone 50 receives the incoming call, i.e., when the controller 25 decides that the cell phone 50 is busy (i.e., when it is decided to "YES" in Step S510), the controller 25 obtains information about a caller such as a telephone number of the caller who calls the cell phone 50 in the vehicle via the cell phone network. The controller 25 obtains the information from the cell phone 50 via the wireless communication element 24. The controller 25 searches individual information in the telephone directory data stored in the hard disk drive 19 in Step S520. The individual information corresponds to the telephone number of the caller, which is obtained from the cell phone 50. In Step S530, the controller 25 controls the display to display an incoming call screen based on the searching result.

Specifically, when the controller 25 finds the individual information in the telephone directory data corresponding to the telephone number of the caller, the controller 25 reads the individual information of the caller from the telephone directory data in the hard disk drive 19. Then, the display 21 displays the incoming call screen, on which a message "INCOMING CALL," the telephone number of the caller and the individual information such as the name of the caller are shown.

When the controller does not find the individual information in the telephone directory data corresponding to the telephone number of the caller, the controller 25 controls the display 21 to display the incoming call screen, on which the message "INCOMING CALL" and the telephone number of the caller are shown. Here, in this case, the incoming call screen does not include information about the name of the caller, i.e., the name of the caller is not displayed on the screen.

After the incoming call screen is displayed, the controller 25 stands by in Step S540 until the cell phone 50 ends to receive the incoming call from the caller. The incoming call from the caller ends when the caller stops to call the cell phone 50, or when the cell phone 50 responds to the incoming call so that the cell phone 50 is busy for communicating with caller. When the cell phone 50 ends the incoming call, the display 21 ends to display the incoming call screen in Step S550. Thus, the free line process ends.

Figure 5B:
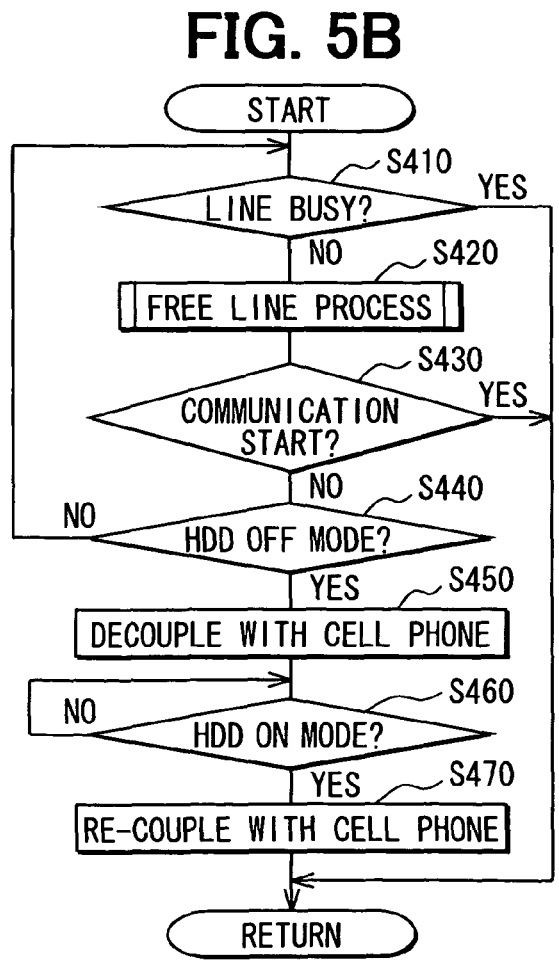
FIG. 5B is a flowchart showing a coupling and managing process.

Thus, after the free line process ends in Step S420 in FIG. 5B, it proceeds to Step S430, so that the controller 25 decides whether the communication to the caller starts. Specifically, when the controller 25 decides in Step S540 that the incoming call ends in order to start communication between the caller and the cell phone 50, the controller 25 decides that the communication to the caller starts, i.e., it is decided to "YES" in Step 5430. When the controller 25 decides that the incoming call ends because of a reason other than the communication to the caller, the controller 25 decides that the communication to the caller does not start, i.e., it is decided to "NO" in Step S430. Further, when it is decided to "NO" in Step S510, the controller 25 decides that the communication to the caller does not start, i.e., it is decided to "NO" in Step S430.

When the communication to the caller starts, i.e., when it is decided to "YES" in Step S430, the controller 25 ends the coupling and managing process without executing Steps S440 to S470.

When the controller 25 decides that the communication to the caller does not start, i.e., when it is decided to "NO" in Step S430, it proceeds to Step S440. In Step S440, the controller 25 decides whether the hard disk drive 19 is set in the off mode.

When the controller 25 decides that the hard disk drive 19 is set in the on mode (i.e., when the controller 25 decides that the hard disk drive 19 is not set in the off mode), i.e., when it is decided to "NO" in Step S440, it returns to Step S410.

When the controller 25 decides that the hard disk drive 19 is set in the off mode, i.e., when it is decided to "YES" in Step S440, the controller 25 decouples the communication between the cell phone 50 and the navigation device 1 via the wireless communication element 24 in Step S450. Then, in Step 460, the controller 25 stands by until the hard disk drive 19 switches from the off mode to the on mode.

When the vehicle passes through the high altitude area so that the vehicle is not disposed in the high altitude area, the hard disk drive 19 switches from the off mode to the on mode. Thus, when it is decided to "YES" in Step S460, it proceeds to Step S470. In Step S470, the controller 25 re-couples the communication between the cell phone 50 and the navigation device 1. Then, the coupling and managing process ends.

In the navigation device 1 according to the present embodiment, the navigation device 1 decouples with the cell phone 50 in Step S450 substantially at the same time when the vehicle enters into the high altitude area so that the hard disk drive 19 is set to the off mode. In this case, even when the cell phone 50 receives the incoming call, the navigation device 1 does not detect the incoming call of the cell phone 50. Thus, the incoming call screen is not displayed on the display 21.

The navigation device 1 re-couples with the cell phone 50 in Step S470 substantially at the same time when the vehicle passes through the high altitude area so that the hard disk drive 19 is set to the on mode. Thus, only while the hard disk drive 19 is set to the on mode, the cell phone 50 is coupled with the navigation device 1. When the cell phone 50 receives the incoming call, the incoming call screen is displayed while the hard disk drive 19 is set to the on mode.

Accordingly, the navigation device 1 protects the user from becoming anxiety since the caller, i.e., the sender is not specified.

When the vehicle is disposed in the high altitude area, the main body 19a of the hard disk drive 19 turns off, so that the controller 25 cannot refer to the telephone directory data stored in the hard disk drive 19. Accordingly, although the incoming call from the caller is notified to the user, the individual information corresponding to the caller based on the telephone directory is not notified. Accordingly, when the vehicle is disposed in the high altitude area, and the incoming call screen is displayed, the message "INCOMING CALL" and the telephone number of the caller are notified, so that the name of the caller provided by the telephone directory data cannot be displayed on the display 21. Thus, in this case, the incoming call screen may bring anxiety on the user since the caller is not specified when the cell phone 50 receives the incoming call. Specifically, since the caller is not specified, the user may misunderstand that the incoming call is derived from an unknown person even when the telephone number of the caller is stored in the telephone directory data in the hard disk drive 19.

In the present embodiment, when the vehicle is disposed in the high altitude area, and the main body 19a of the hard disk drive 19 is set to the off mode, the navigation device 1 is decoupled with the cell phone 50 so that the incoming call screen is not displayed. Thus, even when the cell phone 50 receives the incoming call, the user does not become anxiety since the incoming call screen is not displayed. Thus, the user does not feel anxiety.

Here, the car navigation device 1 provides an in-vehicle device. The processes shown as Steps S340, S450 and S470 provide a coupling means or a coupling element. The free line process shown in FIG. 6 provides an incoming call notification means or an incoming call notification element. Steps S210 and S220 provide a high altitude decision means or a high altitude decision element. Steps S240 and S260 provide a switching means or a switch.

In the above embodiment, the navigation device 1 is coupled with the cell phone 50 by using a short range wireless communication method. Alternatively, the navigation device 1 may physically couple with the cell phone 50 via a communication cable. The controller 25 controls connect and disconnect the physical coupling between the cell phone 50 and the navigation device 1. Further, the display 21 does not display the incoming call screen since the coupling between the navigation device 1 and the cell phone 1 is cut. Alternatively, when the vehicle is disposed in the high altitude area, the navigation device 1 may couple with the cell phone 50 in such a manner that the incoming call screen is not displayed so that incoming call is not notified by the navigation device 1.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle device comprising:
   a communication element for communicating with a cell phone in a vehicle;
   a coupling element for coupling and decoupling between the in-vehicle device and the cell phone via the communication element;
   a hard disk drive for storing a telephone directory data relating to an individual information and a telephone number corresponding to the individual information;
   an incoming call notification element for communicating with the cell phone via the communication element in a case where the coupling element couples between the in-vehicle device and the cell phone, wherein the incoming call notification element notifies a passenger of the vehicle about an incoming call from a caller when the cell phone receives the incoming call via an external telephone network, and wherein the incoming call notification element accesses the telephone directory data in the hard disk drive, and notifies the passenger about the individual information corresponding to the telephone number of the caller;
   a high altitude decision element for deciding whether the vehicle is disposed in a high altitude area having an altitude equal to or higher than a predetermined altitude; and
   a switching element for setting the hard disk drive in an off-mode based on a decision result of the high altitude decision element in a case where the vehicle enters into the high altitude area, and for setting the hard disk drive in an on-mode in a case where the vehicle passes through the high altitude area, wherein the incoming call notification element stops notifying the passenger about the incoming call and the individual information when the hard disk drive is in the off-mode.

2. The in-vehicle device according to claim 1, wherein the communication element communicates in a short range wireless communication, and wherein the coupling element couples between the in-vehicle device and the cell phone via the communication element in a short range wireless communication manner.

3. The in-vehicle device according to claim 1, further comprising:

a position detector for detecting a current position of the vehicle; and a semiconductor memory for storing a two-dimensional map data, which defines the high altitude area, wherein the two dimensional map data includes a plurality of regions, which is provided by dividing a ground surface, wherein the two dimensional map data shows whether a region is the high altitude area, and wherein the high altitude decision element accesses the two-dimensional map data in the semiconductor memory, and decides whether the region corresponding to the current position of the vehicle is the high altitude area.

4. An in-vehicle device comprising:

a communication element for communicating with a cell phone in a vehicle;

a coupling element for coupling and decoupling between the in-vehicle device and the cell phone via the communication element;

a hard disk drive for storing a telephone directory data relating to an individual information and a telephone number corresponding to the individual information;

an incoming call notification element for communicating with the cell phone via the communication element in a case where the coupling element couples between the in-vehicle device and the cell phone, wherein the incoming call notification element notifies a passenger of the vehicle about an incoming call from a caller when the cell phone receives the incoming call via an external telephone network, and wherein the incoming call notification element accesses the telephone directory data in the hard disk drive, and notifies the passenger about the individual information corresponding to the telephone number of the caller;

a high altitude decision element for deciding whether the vehicle is disposed in a high altitude area having an altitude equal to or higher than a predetermined altitude; and a switching element for setting the hard disk drive in an off-mode based on a decision result of the high altitude decision element in a case where the vehicle enters into the high altitude area, and for setting the hard disk drive in an on-mode in a case where the vehicle passes through the high altitude area, wherein the coupling element decouples between the in-vehicle device and the cell phone when the hard disk drive is in the off-mode, and wherein the coupling element couples between the in-vehicle device and the cell phone when the hard disk drive is in the on-mode.

5. The in-vehicle device according to claim 4, wherein the communication element communicates in a short range wireless communication, and wherein the coupling element couples between the in-vehicle device and the cell phone via the communication element in a short range wireless communication manner.

6. The in-vehicle device according to claim 4, further comprising:

a position detector for detecting a current position of the vehicle; and a semiconductor memory for storing a two-dimensional map data, which defines the high altitude area, wherein the two dimensional map data includes a plurality of regions, which is provided by dividing a ground surface, wherein the two dimensional map data shows whether a region is the high altitude area, and wherein the high altitude decision element accesses the two-dimensional map data in the semiconductor memory, and decides whether the region corresponding to the current position of the vehicle is the high altitude area.

7. A method for controlling an in-vehicle device comprising:

communicating with a cell phone in a vehicle;

coupling and decoupling between the in-vehicle device and the cell phone;

storing a telephone directory data in a hard disk drive, wherein the data relates to an individual information and a telephone number corresponding to the individual information;

notifying a passenger of the vehicle about an incoming call from a caller when the cell phone receives the incoming call via an external telephone network;

accessing the telephone directory data in the hard disk drive, and notifying the passenger about the individual information corresponding to the telephone number of the caller;

deciding whether the vehicle is disposed in a high altitude area having an altitude equal to or higher than a predetermined altitude; and setting the hard disk drive in an off-mode when the vehicle enters into the high altitude area, and setting the hard disk drive in an off-mode when the vehicle passes through the high altitude area, wherein the notifying the passenger about the incoming call and the accessing the telephone directory data are prohibited when the hard disk drive is in the off-mode.

* * * * *